US012567399B2

(12) United States Patent
Kuroyama et al.

(10) Patent No.: US 12,567,399 B2
(45) Date of Patent: Mar. 3, 2026

(54) MANAGEMENT APPARATUS, MANAGEMENT SYSTEM, MANAGEMENT METHOD, AND RECORDING MEDIUM

(71) Applicant: Panasonic Intellectual Property Management Co., Ltd., Osaka (JP)

(72) Inventors: Kazuhiro Kuroyama, Osaka (JP); Yoichi Ikeda, Hyogo (JP); Yoshiki Ohashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 17/908,851

(22) PCT Filed: Dec. 24, 2021

(86) PCT No.: PCT/JP2021/048132

§ 371 (c)(1),
(2) Date: Sep. 1, 2022

(87) PCT Pub. No.: WO2023/013094

PCT Pub. Date: Feb. 9, 2023

(65) Prior Publication Data

US 2023/0230573 A1 Jul. 20, 2023

(30) Foreign Application Priority Data

Aug. 3, 2021 (JP) ................................ 2021-127765

(51) Int. Cl.
*G10L 13/00* (2006.01)
*G10L 13/027* (2013.01)
(Continued)

(52) U.S. Cl.
CPC ........... *G10L 13/027* (2013.01); *G10L 13/04* (2013.01)

(58) Field of Classification Search
CPC ....... G10L 13/027; G10L 13/04; G10L 15/22; G10L 2015/223; G10L 15/1815;
(Continued)

(56) References Cited

U.S. PATENT DOCUMENTS 11,528,274 B1 * 12/2022 Krishnamoorthy ... H04W 12/35
11,825,023 B2 * 11/2023 Spohrer ................ G06N 5/043
(Continued)

FOREIGN PATENT DOCUMENTS

AU 2020203653 A1 * 6/2020 .......... G06F 11/3055
JP 04-242480 A 8/1992
JP 2015-154248 A 8/2015
WO 2013/001701 A1 1/2013

OTHER PUBLICATIONS

International Search Report issued on Mar. 29, 2022 in International Patent Application No. PCT/JP2021/048132.
Extended European Search Report dated Sep. 19, 2024 issued in the corresponding European Patent Application No. 21926056.9.

*Primary Examiner* — Michael Ortiz-Sanchez
(74) *Attorney, Agent, or Firm* — Rimon P.C.

(57) ABSTRACT

A management apparatus includes: an extractor that extracts, on the basis of a predetermined condition, one or more utterance histories from a plurality of utterance histories each indicating the content of a voice caused to be output by a first device (e.g., utterance device); and a display controller that causes a second device (e.g., display device) to display information indicating the one or more utterance histories.

7 Claims, 7 Drawing Sheets

| Status of use | Corresponding interest | Corresponding utterance history |
|---|---|---|
| Washing machine: use of disinfection mode ≥ once/week | Cleanliness of surroundings | ·Robotic vacuum cleaner (error/dust)<br>·Air cleaner |
| Air conditioner: use of air blowing mode with disinfection function ≥ once/week | | |
| Robotic vacuum cleaner: number of times of use of through cleaning mode ÷ total number of times of cleaning ≥ 30% | | |
| Robotic vacuum cleaner: frequency of dust full error < once/10 times of cleaning | Maintenance of home appliances | ·Washing machine (maintenance)<br>·Refrigerator (water supply)<br>·Air cleaner (water supply) |
| Washing machine: automatic dose detergent small remaining amount error < once/month | | |
| Washing machine: setting of automatic dose detergent amount = small | Saving | ·Washing completed<br>·Forgetting to turn off heat retention of rice cooker |
| Air conditioner: ON/OFF frequency ≥ 3 times/day | | |
| Washing machine: setting of tub cleaning sign = ON | Dirt in hard-to-see place | ·Cooling inside convection microwave oven |
| TV/recorder: timer recording/viewing of cooking program ≥ once/week | Cooking | ·Rice cooker<br>·Convection microwave oven |

(51) Int. Cl.

| | |
|---|---|
| ***G10L 13/04*** | (2013.01) |
| ***G10L 21/00*** | (2013.01) |
| ***G10L 25/00*** | (2013.01) |

(58) Field of Classification Search

CPC ....... G10L 15/30; G10L 15/08; G10L 15/183; G10L 2015/088; G10L 17/22; G10L 15/01; G10L 15/06; G10L 15/26; G10L 2015/221; G10L 25/72; G06F 3/167; G06F 9/453; G06F 16/951; G06F 3/048; G06F 16/71; G06F 16/9535; G06F 9/4843; G06F 16/00; G06F 16/3329; G06F 16/243; G06F 40/40; G06F 40/279; G06F 16/3344; G06F 16/9035; G06F 16/24569; G06F 16/2457; G06F 16/285; G06F 16/35; G06F 16/355; G06F 3/16; G06F 11/3055; G06F 11/3065; G06F 11/30; G06F 11/3003

See application file for complete search history.

(56) References Cited

U.S. PATENT DOCUMENTS

| | | | | |
|---|---|---|---|---|
| 11,881,214 | B1 * | 1/2024 | Kadam | G06F 16/635 |
| 2007/0162298 | A1 * | 7/2007 | Melton | G06F 16/951<br>702/179 |
| 2010/0076753 | A1 * | 3/2010 | Doi | G10L 15/22<br>704/235 |
| 2012/0290880 | A1 * | 11/2012 | Bardack | G06F 11/3082<br>714/E11.029 |
| 2013/0151703 | A1 | 6/2013 | Nakaso et al. | |
| 2017/0154626 | A1 | 6/2017 | Kim et al. | |
| 2017/0277993 | A1 * | 9/2017 | Beaver | G06Q 30/0201 |
| 2018/0330589 | A1 * | 11/2018 | Horling | G05B 15/02 |
| 2019/0324925 | A1 * | 10/2019 | Toyoda | G06F 13/102 |
| 2020/0293568 | A1 * | 9/2020 | Lu | G06Q 30/0255 |
| 2021/0182350 | A1 * | 6/2021 | Gottumukkala | G06F 16/9035 |

* cited by examiner

FIG. 2

| Status of use | Corresponding interest | Corresponding utterance history |
|---|---|---|
| Washing machine:<br>use of disinfection mode ≥ once/week | Cleanliness of surroundings | ·Robotic vacuum cleaner (error/dust)<br>·Air cleaner |
| Air conditioner:<br>use of air blowing mode with disinfection function ≥ once/week | | |
| Robotic vacuum cleaner:<br>number of times of use of through cleaning mode ÷ total number of times of cleaning ≥ 30% | | |
| Robotic vacuum cleaner:<br>frequency of dust full error < once/10 times of cleaning | Maintenance of home appliances | ·Washing machine (maintenance)<br>·Refrigerator (water supply)<br>·Air cleaner (water supply) |
| Washing machine:<br>automatic dose detergent small remaining amount error < once/month | | |
| Washing machine:<br>setting of automatic dose detergent amount = small | Saving | ·Washing completed<br>·Forgetting to turn off heat retention of rice cooker |
| Air conditioner:<br>ON/OFF frequency ≥ 3 times/day | | |
| Washing machine:<br>setting of tub cleaning sign = ON | Dirt in hard-to-see place | ·Cooling inside convection microwave oven |
| TV/recorder:<br>timer recording/viewing of cooking program ≥ once/week | Cooking | ·Rice cooker<br>·Convection microwave oven |

MANAGEMENT APPARATUS, MANAGEMENT SYSTEM, MANAGEMENT METHOD, AND RECORDING MEDIUM

TECHNICAL FIELD

The present disclosure relates to a management apparatus, a management system, a management method, and a recording medium for managing an utterance history.

BACKGROUND ART

Patent Literature (PTL) 1 discloses an apparatus that communicates with a terminal device carried by a user to sequentially receive position information indicating a current position, determines a control position before returning home for a home appliance to be controlled on the basis of operation information, setting information, and movement history information, and controls the home appliance in accordance with the setting information on the basis of the position information when the current position of the user returning home reaches the control position before returning home. The apparatus disclosed in PTL 1 displays operations performed by the user on a plurality of electronic devices, such as home appliances, and the states of the electronic devices.

CITATION LIST

Patent Literature

[PTL 1] Japanese Unexamined Patent Application Publication No. 2015-154248

SUMMARY OF INVENTION

Technical Problem

There has hitherto been a device that outputs by voice (i.e., utters) the state or the like of the device. Here, for example, an utterance history indicating the content of an utterance caused to be made by the device is notified to a user by a display device using an image or the like. In such a case, for example, when all utterance histories are to be displayed by the display device, and there are many utterance histories, it may be difficult for the user to check an utterance history that the user wants to check. Therefore, when utterance histories are to be displayed as thus described, it is desirable for the utterance histories to be displayed in a manner easily viewable by the user.

The present disclosure provides a management apparatus and the like capable of making an utterance history easily viewable by a user.

Solution to Problem

A management apparatus according to one aspect of the present disclosure includes: an extractor that extracts, on the basis of a predetermined condition, one or more utterance histories from a plurality of utterance histories each indicating the content of a voice caused to be output by a first device; and a display controller that causes a second device to display display information indicating the one or more utterance histories.

The management system according to one aspect of the present disclosure includes the management apparatus, the first device, and the second device.

A management method according to one aspect of the present disclosure includes: extracting, on the basis of a predetermined condition, one or more utterance histories from a plurality of utterance histories each indicating the content of a voice caused to be output by a first device; and causing a second device to display display information indicating the one or more utterance histories.

A recording medium according to one aspect of the present disclosure is a non-transitory computer-readable recording medium having recorded thereon a program for causing a computer to execute the management method.

Note that these comprehensive or specific aspects may be achieved by a system, a method, an integrated circuit, a computer program, or a recording medium such as a computer-readable compact disc read-only memory (CD-ROM) or may be achieved by any combination of the system, method, integrated circuit, computer program, and recording medium.

Advantageous Effects of Invention

According to the present disclosure, it is possible to provide a management apparatus and the like capable of making an utterance history easily viewable by a user.

BRIEF DESCRIPTION OF DRAWINGS

FIG. 2 illustrates an example of an interest database according to the embodiment.

DESCRIPTION OF EMBODIMENTS

Figure 1:
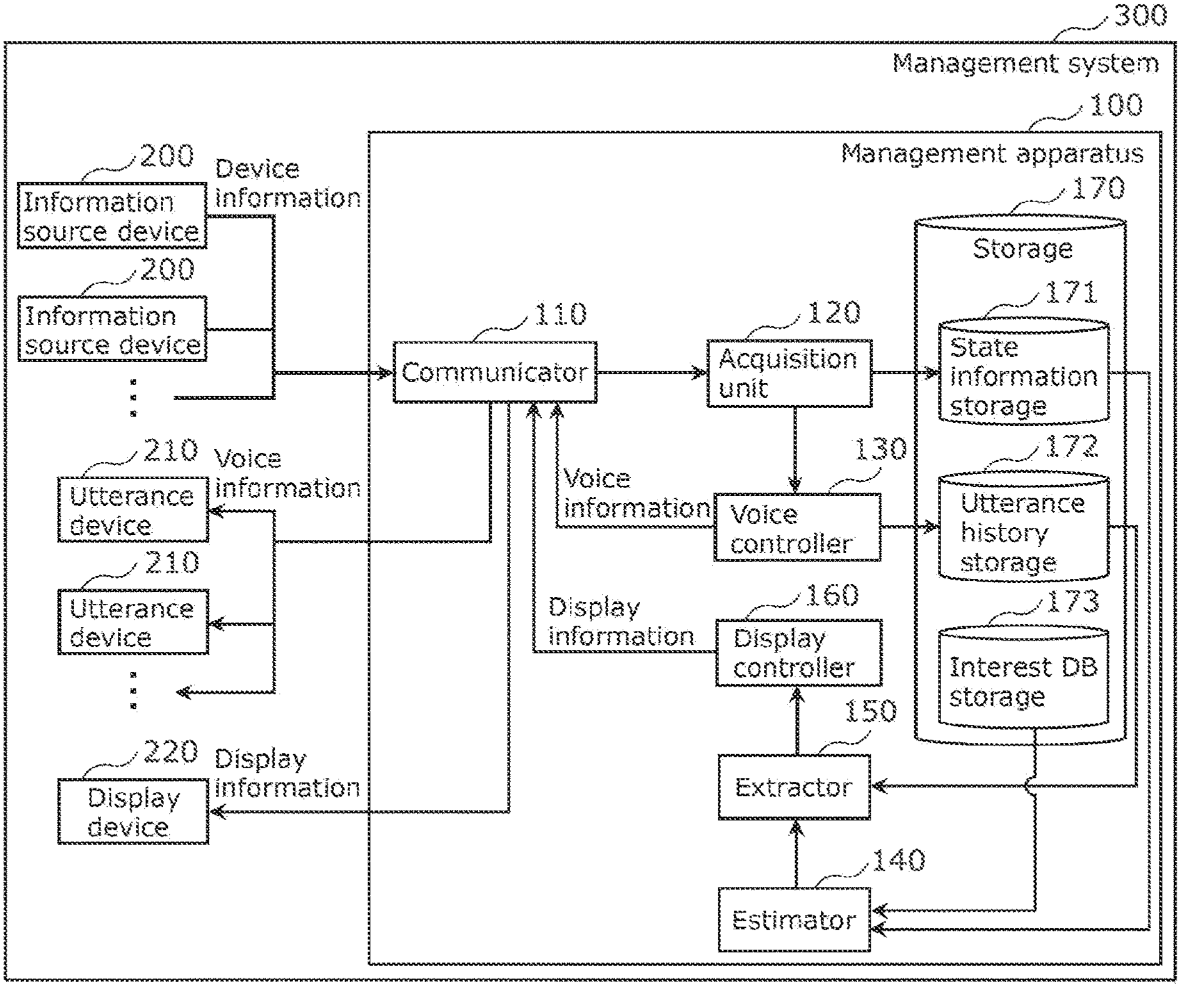
FIG. 1 is a block diagram illustrating a configuration of a management system according to an embodiment.

Embodiments of the present disclosure will be described in detail below with reference to the drawings. Note that each of the embodiments described below shows a specific example of the present disclosure. Accordingly, numerical values, shapes, materials, components, arrangement and connection modes of the components, steps, the order of the steps, and the like, which will be shown in the following embodiments, are only examples and are not intended to limit the present disclosure. Therefore, among the components in the following embodiments, components not described in the independent claims of the present disclosure will be described as optional components.

Each of the drawings is a schematic drawing and is not necessarily illustrated exactly. In the drawings, the same constituent members are denoted by the same reference numerals.

Embodiment

Configuration

FIG. 1 is a block diagram illustrating a functional configuration of management system 300 according to an embodiment.

Management system 300 is a system in which, when information, such as information indicating a change in a state of processing (operation), information notifying a failure, information for urging a user to replace a part such as a filter, or information for making a notification (recommendation notification) to the user of a function of information source device 200, is output in information source device 200, the information is notified (output) to the user by voice (i.e., the information is uttered).

Management system 300 is provided with information source device 200, utterance device 210, display device 220, and management apparatus 100.

Information source device 200 is a device capable of outputting the above information relating to information source device 200. Information source device 200 transmits, to management apparatus 100, device information including, for example, identification information that is a unique identifier indicating information source device 200, performance information indicating the performance (specification) and the like of information source device 200, and state information indicating the content of processing (operation) performed and the state of information source device 200 such as a failure.

Information source device 200 includes, for example, a communication interface for communicating with management apparatus 100, an execution unit that performs processing such as refrigeration, washing, or heating, a detector achieved by a sensor or the like for detecting the state of information source device 200, and a controller achieved by a processor, a memory, and the like for controlling various processing of information source device 200. For example, when information source device 200 performs wired communication with management apparatus 100, the communication interface is achieved by a connector or the like to which a communication line is connected, and when information source device 200 performs wireless communication, the communication interface is achieved by an antenna, a wireless communication circuit, or the like. Information source device 200 may be, for example, an electric appliance (also referred to as a home appliance), such as a refrigerator, a washing machine, a microwave oven, a lighting device, or a door phone.

Note that information source device 200 is an example of a third device.

Utterance device 210 is a device including a component capable of outputting a voice, such as a loudspeaker. For example, when receiving voice information from management apparatus 100, utterance device 210 outputs a voice based on the received voice information.

Utterance device 210 includes, for example, a loudspeaker, an amplifier, a memory that stores a control program for causing the loudspeaker to output a voice based on the voice information received from management apparatus 100, a processor for executing the control program, and a communication interface for communicating with management apparatus 100. For example, when utterance device 210 performs wired communication with management apparatus 100, the communication interface is achieved by a connector or the like to which a communication line is connected, and when utterance device 210 performs wireless communication, the communication interface is achieved by an antenna, a wireless communication circuit, or the like. Utterance device 210 is, for example, an electric appliance such as an air conditioner, a television (TV), or an autonomous vacuum cleaner (so-called robotic vacuum cleaner). Utterance device 210 only needs to be a device capable of outputting a voice and may be a terminal device such as a smartphone or a mobile phone.

Note that utterance device 210 is an example of a first device.

Each of two information source devices 200 and two utterance devices 210 is disposed, for example, in a house where the user resides. Management apparatus 100 is disposed, for example, outside the house.

Display device 220 is a device for displaying information indicating an utterance history. Display device 220, for example, receives display information from management apparatus 100 and displays the received display information to display one or more utterance histories.

Display device 220 includes, for example, a display, a memory that stores a control program for displaying, on the display, display information indicating an utterance history received from management apparatus 100, a processor that executes the control program, and a communication interface for communicating with management apparatus 100. For example, when display device 220 performs wired communication with management apparatus 100, the communication interface is achieved by a connector or the like to which a communication line is connected, and when display device 220 performs wireless communication, the communication interface is achieved by an antenna, a wireless communication circuit, or the like. Display device 220 is achieved by, for example, a personal computer, a tablet terminal, or a smartphone. In the present embodiment, display device 220 is a smartphone. Display device 220 only needs to be a device capable of displaying display information and may be, for example, a device having a display such as a television.

Note that display device 220 is an example of a second device.

Although two information source devices 200 are illustrated in FIG. 1, the number of information source devices 200 included in management system 300 may be one or may be three or more, and the number is not particularly limited.

Although two utterance devices 210 are illustrated in FIG. 1, the number of utterance devices 210 included in management system 300 may be one or may be three or more, and the number is not particularly limited.

Although one display device 220 is illustrated in FIG. 1, the number of display devices 220 included in management system 300 may be more than one.

Management apparatus 100 is a device for causing utterance device 210 to output a voice relating to information such as device information received from information source device 200, on the basis of the information. For example, when receiving state information from information source device 200, management apparatus 100 selects voice information corresponding to state information stored in storage 170 and transmits the selected voice information to utterance device 210, thereby causing utterance device 210 to output a voice based on the voice information.

Management apparatus 100 is communicably connected to information source device 200, utterance device 210, and display device 220 via a network such as the Internet.

Note that management apparatus 100 may be connected to information source device 200, utterance device 210, and display device 220 so as to be capable of wired communication or wireless communication.

A communication protocol used for the communication between management apparatus 100 and each of information source device 200, utterance device 210, and display device 220 is not particularly limited. Examples of the communication protocol include Wi-Fi (registered trademark), Bluetooth (registered trademark), and ZigBee (registered trademark).

Management apparatus 100 is achieved by a computer including, for example, a communication interface for communicating with information source device 200, utterance device 210, and the devices of display device 220, a non-volatile memory in which a program is stored, a volatile memory which is a temporary storage area for executing the program, input/output ports for transmitting and receiving signals, and a processor for executing the program. Management apparatus 100 is, for example, a server device disposed in a building of a company or the like rather than in the house where information source device 200 is disposed.

Management apparatus 100 is provided with communicator 110, acquisition unit 120, voice controller 130, estimator 140, extractor 150, display controller 160, and storage 170. Storage 170 includes state information storage 171, utterance history storage 172, and interest DB storage 173.

Communicator 110 is a communication interface for communicating with information source device 200, utterance device 210, and display device 220. For example, communicator 110 is achieved by a connector or the like to which a communication line is connected in the case of wired communication with information source device 200, utterance device 210, and display device 220, and is achieved by an antenna, a wireless communication circuit, or the like in the case of wireless communication.

Acquisition unit 120 is a processor for acquiring device information including the identification information of information source device 200, the performance information of information source device 200, and the state information of information source device 200. Acquisition unit 120 acquires the device information by, for example, communicating with information source device 200 via communicator 110.

When management apparatus 100 is equipped with a reception device such as a mouse or keyboard for receiving input from the user, acquisition unit 120 may acquire the device information through the reception device.

Acquisition unit 120 causes storage 170 to store the acquired device information and also output the acquired device information to voice controller 130. For example, acquisition unit 120 causes state information storage 171 to store the state information included in the acquired device information.

Voice controller 130 is a processor for causing the first device (utterance device 210 in the present embodiment) to output a voice. Specifically, voice controller 130 communicates with utterance device 210 via communicator 110, thereby causing utterance device 210 to output a voice. For example, voice controller 130 transmits voice information to utterance device 210 via communicator 110, thereby causing utterance device 210 to output a voice.

The voice information is information indicating a voice to be caused to be output by utterance device 210. Voice controller 130 determines the content of a voice to be caused to be output by utterance device 210 on the basis of information such as the device information acquired by acquisition unit 120 and transmits voice information indicating the determined content to utterance device 210.

Examples of the voice information include voice data of a sentence (utterance sentence) indicating that information source device 200 has started its operation, voice data of a sentence indicating that information source device 200 has finished its operation, voice data of a sentence indicating that information source device 200 has operated in conjunction with the other information source device 200, voice data of a sentence for urging the user to upgrade, voice data of a sentence for recommending the user to use a function of information source device 200, and voice data of a sentence indicating that a failure has occurred.

The voice information is stored in storage 170 in association with information such as the device information. Voice controller 130 selects, for example, voice information associated with the information acquired by acquisition unit 120 and transmits the selected voice information to utterance device 210.

Note that the voice information may be stored in a storage included in utterance device 210. In this case, management apparatus 100 may, for example, transmit the information acquired by acquisition unit 120 to utterance device 210, thereby causing utterance device 210 to output a voice relating to the information.

When management system 300 is provided with a plurality of utterance devices 210, voice controller 130 may cause any one of the plurality of utterance devices 210 to output a voice or may cause any two or more of the plurality of utterance devices 210 to output a voice.

Further, voice controller 130 causes utterance history storage 172 to store a plurality of utterance histories each indicating the content of a voice caused to be output by utterance device 210.

The utterance history is information indicating the content of a voice caused to be output by utterance device 210. Specifically, the utterance history is information that includes content information indicating the content of a voice caused to be output by utterance device 210. The content information is, for example, information indicating that utterance device 210 output "washing has started" by voice when voice controller 130 caused utterance device 210 to utter "washing has started". For example, when causing utterance device 210 to output a voice, voice controller 130 causes utterance history storage 172 to store, as an utterance history (history information), content information, identification information indicating utterance device 210 caused to output the voice, and date and time information indicating the date and time when the voice was caused to be output.

Estimator 140 is a processor that estimates the interest of the user who uses the third device (information source device 200 in the present embodiment) on the basis of state information indicating the state of the third device.

The user's interest is, for example, a matter about the cleaning of information source device 200 or a matter about cleanliness in the house where information source device 200 is disposed, saving, or an interest of the user such as cooking or cleaning, and is a matter in which the user has a particular interest when the user uses information source device 200.

Estimator 140 specifies the status of use of information source device 200 by the user on the basis of the state information stored in state information storage 171, for example, and estimates (determines) the user's interest on the basis of the specified status of use and interest database (DB).

The interest DB is a database (information) indicating a correspondence relationship between the status of use of information source device 200 and the user's interest. For example, the interest DB is stored in advance in interest DB storage 173. In the present embodiment, the interest DB indicates a correspondence relationship between the status of use of information source device 200, the user's interest, and the utterance history.

Extractor 150 is a processor that extracts, on the basis of a predetermined condition, one or more utterance histories from a plurality of utterance histories each indicating the content of a voice caused to be output by the first device. For example, extractor 150 extracts one or more utterance histories from the plurality of utterance histories stored in utterance history storage 172 on the basis of a predetermined condition.

The predetermined condition is, for example, the user's interest estimated by estimator 140. Extractor 150 specifies, for example, one or more utterance histories corresponding to the user's interest estimated by estimator 140 on the basis of the interest DB and extracts the specified one or more utterance histories from the plurality of utterance histories stored in utterance history storage 172.

FIG. 2 is a diagram illustrating an example of the interest DB according to the embodiment. Specifically, FIG. 2 is a diagram schematically illustrating in a table an interest DB in which the status of use of information source device 200 by the user is associated with an interest and an utterance history corresponding to the status of use.

The "status of use" indicates the status of use of information source device 200 by the user, specified by estimator 140 on the basis of the state information stored in state information storage 171.

For example, it is assumed that a function of a disinfection mode of a washing machine, which is an example of information source device 200, has been used one or more times a week ("Washing machine: use of disinfection mode≥once/week"). In this case, for example, estimator 140 estimates that the user is interested in the cleanliness of his or her surroundings, in other words, the user's interest is "the cleanliness of his or her surroundings". In this case, for example, extractor 150 extracts, from the plurality of utterance histories stored in utterance history storage 172, an utterance history considered to be correlated with the cleanliness of the user's surroundings, such as an utterance history relating to an error or dust of a robotic vacuum cleaner ("Robotic vacuum cleaner (error/dust)") and an utterance history relating to an air cleaner ("Air cleaner").

Alternatively, for example, it is assumed that an air blowing mode with a disinfection function in an air conditioner, which is an example of information source device 200, has been used more than once a week ("Air conditioner: use of air blowing mode with disinfection function≥once/week"). In this case, for example, estimator 140 estimates that the user's interest is "the cleanliness of his or her surroundings". In this case, for example, extractor 150 extracts, from the plurality of utterance histories stored in utterance history storage 172, an utterance history considered to be correlated with the cleanliness of the user's surroundings, such as an utterance history relating to an error or dust of the robotic vacuum cleaner ("Robotic vacuum cleaner (error/dust)") and an utterance history relating to the air cleaner ("Air cleaner").

Alternatively, for example, it is assumed that the function of the exhaustive cleaning mode of the robotic vacuum cleaner, which is an example of information source device 200, has been used at a frequency of 30% or more with respect to the total number of times of cleaning of the robotic vacuum cleaner ("Robotic vacuum cleaner: number of times of use of through cleaning mode÷total number of times of cleaning≥30%"). In this case, for example, estimator 140 estimates that the user's interest is "the cleanliness of his or her surroundings". In this case, for example, extractor 150 extracts, from the plurality of utterance histories stored in utterance history storage 172, an utterance history considered to be correlated with the cleanliness of the user's surroundings, such as an utterance history relating to an error or dust of the robotic vacuum cleaner ("Robotic vacuum cleaner (error/dust)") and an utterance history relating to the air cleaner ("Air cleaner").

Alternatively, for example, it is assumed that the frequency of acquisition unit 120 acquiring error information indicating that a dust box is full as state information is less than once in ten times of cleaning of the robotic vacuum cleaner which is an example of information source device 200 ("Robotic vacuum cleaner: frequency of dust full error<once/10 times of cleaning"). In this case, for example, estimator 140 estimates that the user's interest is "the maintenance of home appliances". In this case, for example, extractor 150 extracts, from the plurality of utterance histories stored in utterance history storage 172, an utterance history considered to be correlated with the maintenance of home appliances, such as an utterance history relating to the cleaning of the washing machine ("Washing machine (maintenance)"), an utterance history relating to a water supply tank of a refrigerator ("Refrigerator (water supply)"), and an utterance history relating to the water supply tank of the air cleaner ("Air cleaner (water supply)").

Alternatively, for example, it is assumed that the frequency of acquisition unit 120 acquiring, as state information, error information indicating that the remaining amount of automatic dose detergent is less than a predetermined amount from a washing machine, which is an example of information source device 200, is less than once a month ("Washing machine: automatic dose detergent small remaining amount error<once/month"). In this case, for example, estimator 140 estimates that the user's interest is "the maintenance of home appliances". In this case, for example, extractor 150 extracts, from the plurality of utterance histories stored in utterance history storage 172, an utterance history considered to be correlated with the maintenance of home appliances, such as an utterance history relating to the cleaning of the washing machine ("Washing machine (maintenance)"), an utterance history relating to the water supply tank of the refrigerator ("Refrigerator (water supply)"), and an utterance history relating to the water supply tank of the air cleaner ("Air cleaner (water supply)").

Alternatively, for example, it is assumed that acquisition unit 120 has acquired state information indicating that the amount of automatic dose detergent at the time of washing is set to "small" from a washing machine which is an example of information source device 200 ("Washing machine: setting of automatic dose detergent amount=small"). In this case, for example, estimator 140 estimates that the user's interest is "saving". In this case, for example, extractor 150 extracts, from the plurality of utterance histories stored in utterance history storage 172, an utterance history considered to be correlated with saving, such as an utterance history notifying that washing has been completed ("Washing completed") because it is estimated that the user is likely to want to avoid waste like redoing washing, and an utterance history notifying that a heat-retaining function of a rice cooker has been continuously used for a predetermined period of time or more ("Forgetting to turn off heat retention of rice cooker").

Alternatively, for example, it is assumed that the frequency of switching the power on/off of the air conditioner, which is an example of information source device 200, is three or more times per day ("Air conditioner: ON/OFF frequency≥3 times/day"). In this case, for example, estimator 140 estimates that the user's interest is "saving". In this case, for example, extractor 150 extracts, from the plurality of utterance histories stored in utterance history storage 172, an utterance history considered to be correlated with saving, such as an utterance history notifying that washing has been completed ("Washing completed") and an utterance history notifying that the heat-retaining function of the rice cooker has been continuously used for a predetermined period of time or more ("Forgetting to turn off heat retention of rice cooker").

Alternatively, for example, it is assumed that a setting has been made to make a notification for prompting the user to clean the washing tub of the washing machine which is an example of information source device 200 ("Washing machine: setting of tub cleaning sign=ON"). In this case, for example, estimator 140 estimates that the user's interest is "dirt in a hard-to-see place". In this case, for example, extractor 150 extracts, from the plurality of utterance histories stored in utterance history storage 172, an utterance history considered to be correlated with dirt that is difficult to see, such as an utterance history relating to cooling inside a convection microwave oven ("Cooling inside convection microwave oven") in order to reduce the propagation of bacteria by lowering the temperature in the convection microwave oven.

Alternatively, for example, it is assumed that the timer recording of a cooking program or the viewing of a cooking program has been performed at least once a week in a television or a recorder which is an example of information source device 200 ("TV/recorder: timer recording/viewing of cooking program≥once/week"). In this case, for example, estimator 140 estimates that the user's interest is "cooking". In this case, for example, extractor 150 extracts, from the plurality of utterance histories stored in utterance history storage 172, an utterance history considered to be correlated with cooking, such as an utterance history relating to the rice cooker ("Rice cooker") and an utterance history relating to the convection microwave oven ("Convection microwave oven").

Note that the user's interests corresponding to the statuses of use of information source device 200 and the utterance histories corresponding to the interests described above are only examples and may be determined arbitrarily.

The predetermined condition need not be the user's interest and is not particularly limited.

The predetermined condition may be, for example, the type of the first device. Here, the type means, for example, a sort (product classification) of a home appliance such as a television or an air conditioner. Alternatively, for example, when management system 300 includes a plurality of information source devices 200 of the same product classification such as televisions, the type is a classification for each television.

Extractor 150 may, for example, extract one or more utterance histories from the plurality of utterance histories each indicating the content of a voice caused to be output by the first device, on the basis of the type of the first device caused to output a voice. For example, when management system 300 includes the robotic vacuum cleaner, the air conditioner, and the television as the first devices, extractor 150 may extract an utterance history indicating the content caused to be output by voice from the television, from a plurality of utterance histories each indicating the content of a voice output from the robotic vacuum cleaner, the air conditioner, or the television.

According to this, for example, when the first device and the second device are achieved by one device such as a television, the device having output a voice displays an utterance history indicating the content of the voice, so that the user can easily find the device having output the voice.

Display controller 160 is a processor that causes the second device (display device 220 in the present embodiment) to display display information indicating one or more utterance histories extracted by extractor 150. Specifically, display controller 160 transmits display information to display device 220 via communicator 110, thereby causing display device 220 to display the display information, that is, one or more utterance histories.

The display information is information indicating one or more utterance histories extracted by extractor 150. The display information may be information indicating only one or more utterance histories extracted by extractor 150 or may include, in addition to the information indicating the one or more utterance histories, information indicating an utterance history other than the one or more utterance histories among the plurality of utterance histories stored in utterance history storage 172. For example, when the display information includes information indicating one or more utterance histories extracted by extractor 150 and one or more utterance histories not extracted by extractor 150, the display information further includes information for indicating the one or more utterance histories extracted by extractor 150 and the one or more utterance histories not extracted by extractor 150 in a distinguishable manner.

The information to be indicated in a distinguishable manner is, for example, information indicating that the display position is different when the display information is displayed on display device 220, information indicating that the extracted utterance history and the unextracted utterance history are enclosed in frames different from each other, information indicating that when the display information is displayed on display device 220, for example, the extracted utterance history is displayed in order from the top, followed by the unextracted utterance history, or information indicating that the extracted utterance history and the unextracted utterance history are displayed in different display modes.

The different display mode is, for example, a mode in which the color of a character string indicating an utterance sentence displayed on display device 220 is different, a mode in which the font of the character string is different, or a mode in which a character, photograph, icon, or the like is present or absent around the character string. Alternatively, for example, the different display mode is a dynamic mode, such as a mode in which the icon is the same and the icon is blinking or not blinking.

Display controller 160 causes display device 220 to display display information indicating, in a distinguishable manner, one or more utterance histories extracted by extractor 150 and an utterance history not extracted by extractor 150 from a plurality of utterance histories each indicating the content that voice controller 130 caused utterance device 210 to output by voice (i.e., the plurality of utterance histories stored in utterance history storage 172).

Note that the display information only needs to be information indicating an utterance history and may be image data or information such as a character string indicating the content of a voice output by utterance device 210. For example, when acquiring information indicating the content of a voice output by utterance device 210 as display information, display device 220 may display the display information by generating an image on the basis of the display information.

When management system 300 is provided with a plurality of display devices 220, display controller 160 may cause any one of the plurality of display devices 220 to display display information or may cause any two or more of the plurality of display devices 220 to display display information.

When utterance device 210 includes a display unit such as a display, display controller 160 may cause utterance device 210 to display the display information. That is, the first device and the second device may be the same device (i.e., one device).

The processors of acquisition unit 120, voice controller 130, estimator 140, extractor 150, and display controller 160 are each achieved by a memory, a control program stored in the memory, and a processor such as a central processor (CPU) for executing the control program. These processors may be achieved by one memory and one processor or may be achieved by a plurality of memories and a plurality of processors different from each other or in any combination. These processors may be achieved, for example, by a dedicated electronic circuit or the like.

Storage 170 is a storage device for storing information to be used by management apparatus 100, such as voice information, device information, display information, and interest DB.

Storage 170 is achieved by, for example, a hard disk drive (HDD), flash memory, or the like.

State information storage 171 stores state information. Note that state information storage 171 may also store identification information or the like included in the device information together with the state information. That is, state information storage 171 may store the device information.

Utterance history storage 172 stores an utterance history indicating the content of a voice that voice controller 130 caused utterance device 210 to output. For example, utterance history storage 172 stores, as an utterance history, content information indicating the content of a voice that voice controller 130 caused utterance device 210 to output, identification information indicating utterance device 210 concerned, and date/time information indicating the date and time when the voice was caused to be output, in association with each other. That is, utterance history storage 172 stores, as an utterance history, when a voice with what content was caused to be output from which utterance device 210 among the one or more utterance devices 210, for example.

Interest DB storage 173 stores an interest DB. Interest DB storage 173 stores an interest DB that is information including, for example, information indicating the status of use of information source device 200, information indicating the interest corresponding to the information that indicates the status of use, and information indicating an utterance history corresponding to the interest.

Note that state information storage 171, utterance history storage 172, and interest DB storage 173 may be achieved by one HDD or the like or may be achieved by a plurality of HDDs or the like different from each other or in any combination.

Examples of Display Information

Next, specific examples of the display information will be described.

First Example

Figure 3:
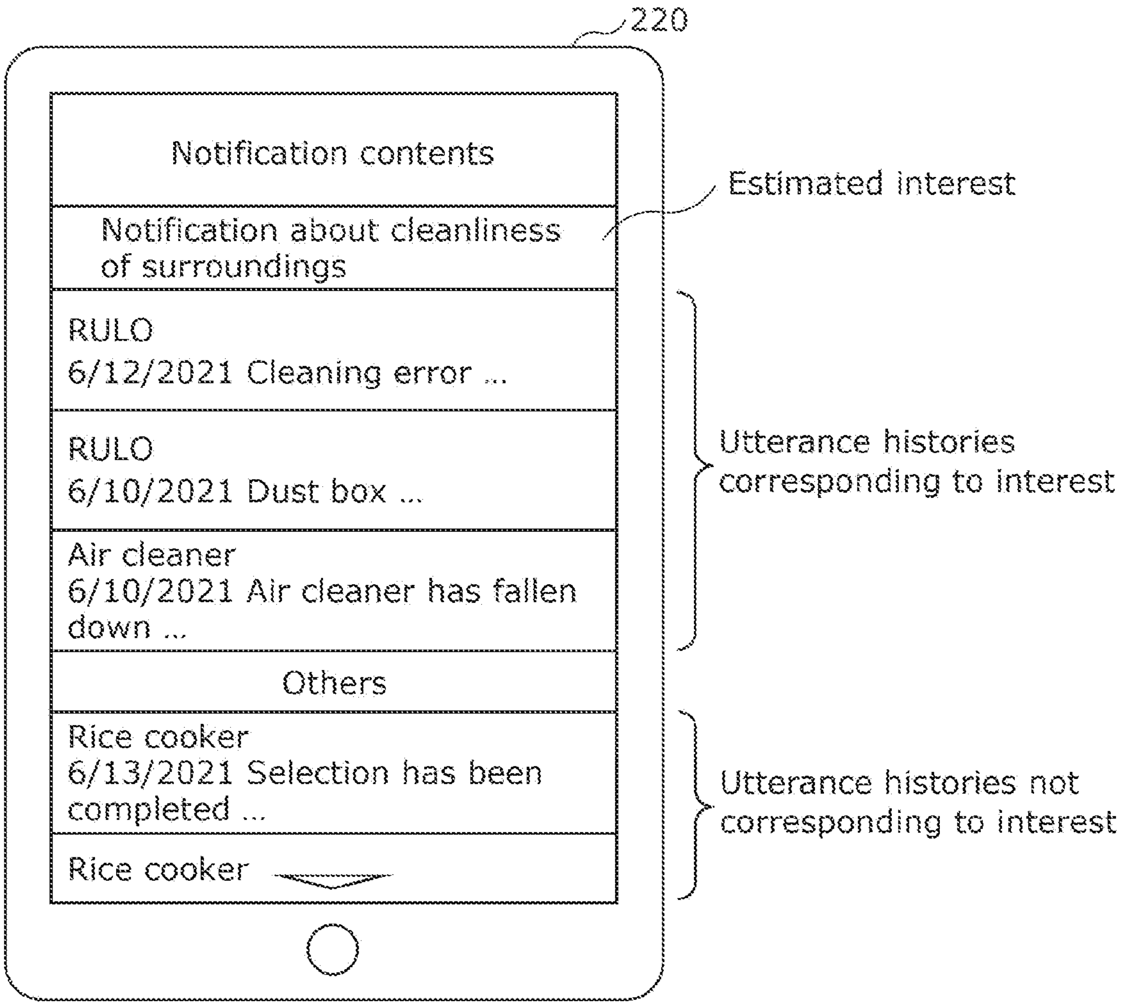
FIG. 3 is a diagram illustrating a first example of display information displayed by a display device according to the embodiment.

FIG. 3 is a diagram illustrating a first example of the display information displayed by display device 220 according to the embodiment. The first example is an example of a case where estimator 140 estimates the user's interest as "the cleanliness of his or her surroundings".

As illustrated in FIG. 3, on the basis of display information received from display controller 160, for example, display device 220 preferentially displays information indicating the interest estimated by estimator 140 and an utterance history corresponding to the interest, that is, one or more utterance histories extracted by extractor 150, on the upper side of the display screen of display device 220 (directly below "Notification about cleanliness of surroundings"). For example, display device 220 displays an utterance history not corresponding to the interest, that is, an utterance history not extracted by extractor 150, in a displayable range below the utterance history corresponding to the interest (immediately below "Others"). As described above, display controller 160 causes display device 220 to display, in a distinguishable manner, one or more utterance histories extracted by extractor 150 and an utterance history not extracted by extractor 150 from a plurality of utterance histories each indicating the content that voice controller 130 caused utterance device 210 to output by voice.

Second Example

Figure 4:
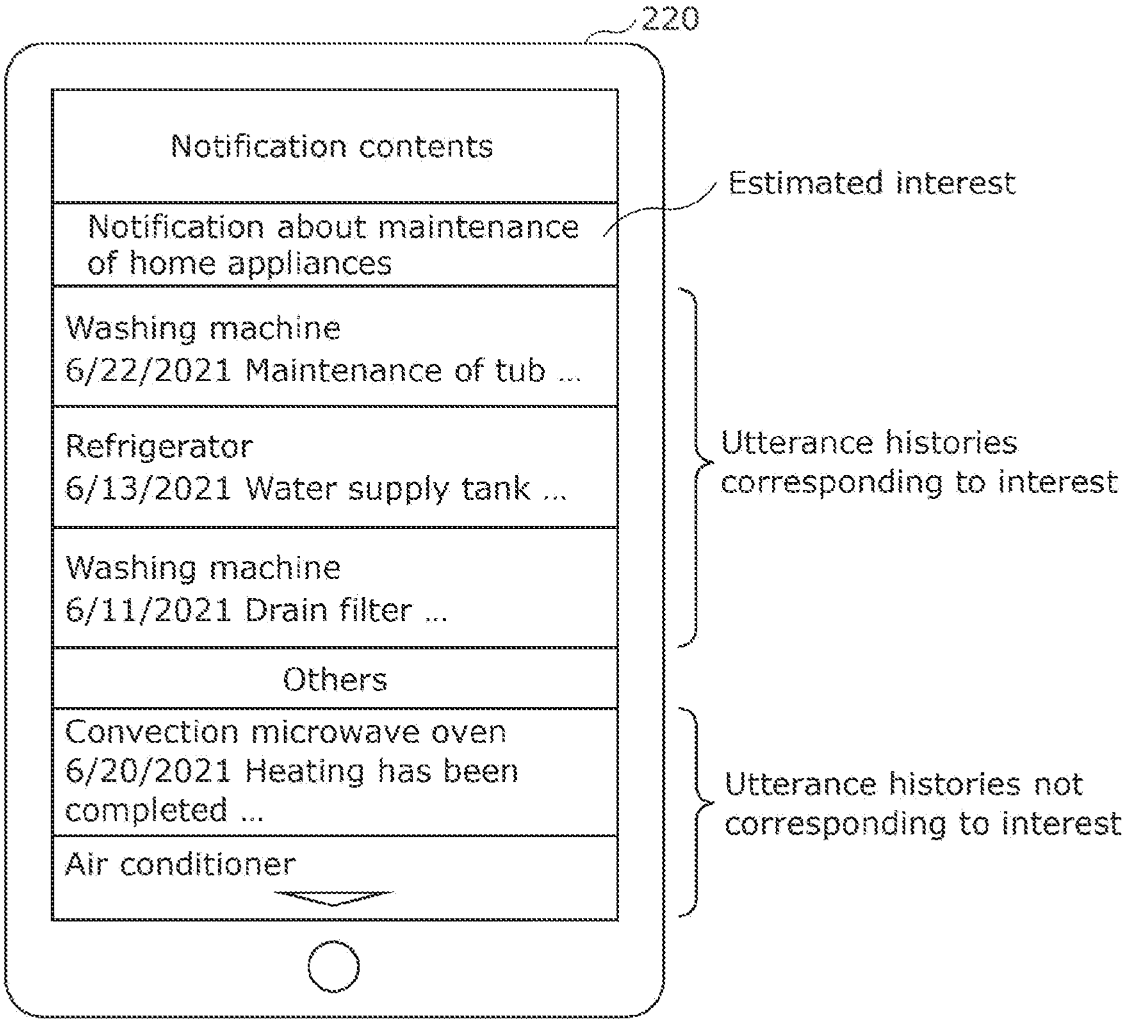
FIG. 4 is a diagram illustrating a second example of the display information displayed by the display device according to the embodiment.

FIG. 4 is a diagram illustrating a second example of the display information displayed by display device 220 according to the embodiment. The second example is an example of a case where estimator 140 estimates the user's interest as "the maintenance of home appliances".

As illustrated in FIG. 4, on the basis of display information received from display controller 160, for example, display device 220 preferentially displays information indicating the interest estimated by estimator 140 and an utterance history corresponding to the interest on the upper side of the display screen of display device 220 (directly below "Notification about maintenance of home appliances"). For example, display device 220 displays an utterance history not corresponding to the interest in a displayable range below the utterance history corresponding to the interest (immediately below "Others"). As described above, display controller 160 causes display device 220 to display, in a distinguishable manner, one or more utterance histories extracted by extractor 150 and an utterance history not extracted by extractor 150 from a plurality of utterance histories each indicating the content that voice controller 130 caused utterance device 210 to output by voice.

Third Example

Figure 5:
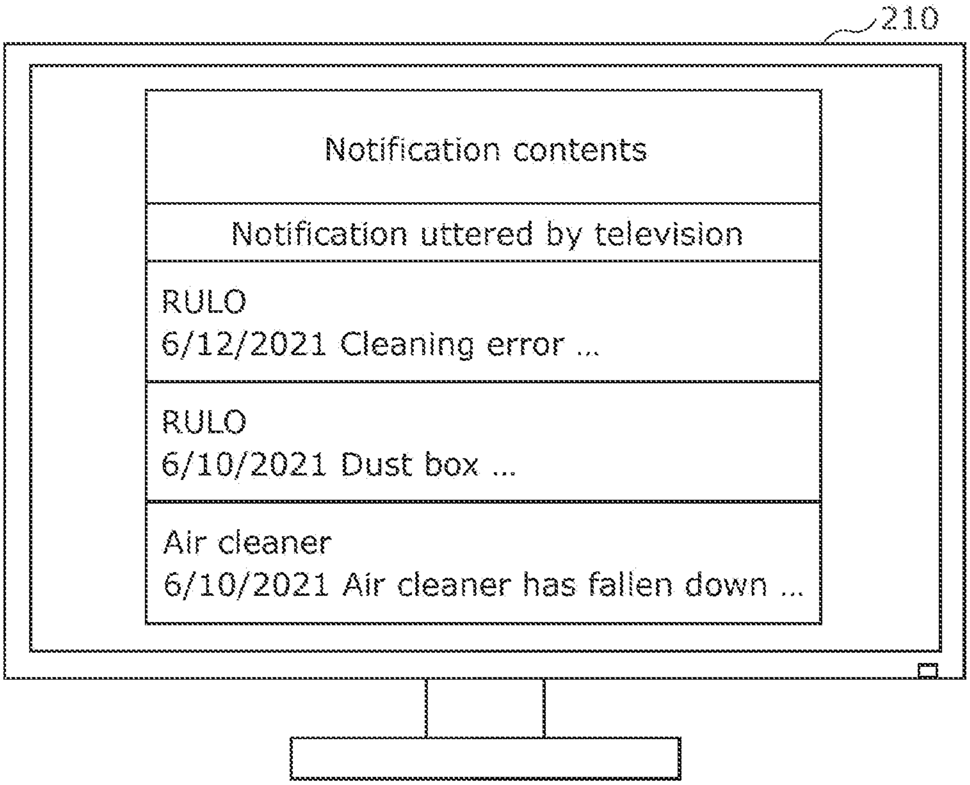
FIG. 5 is a diagram illustrating an example of the display information displayed by an utterance device according to the embodiment.
Figure 6:
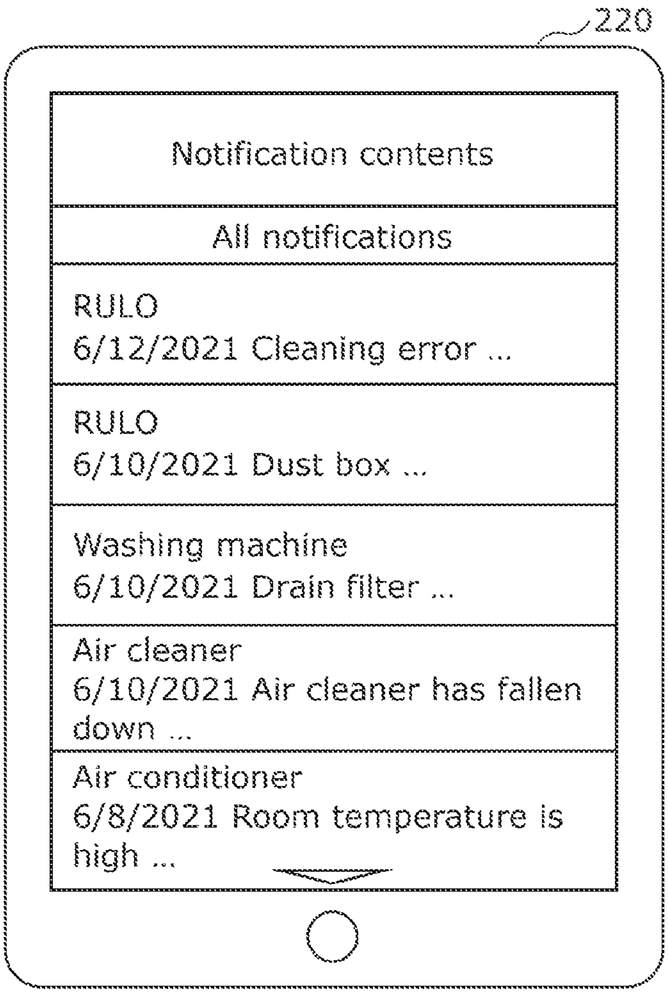
FIG. 6 is a diagram illustrating a third example of the display information displayed by the display device according to the embodiment.

FIG. 5 is a diagram illustrating an example of the display information displayed by utterance device 210 according to the embodiment. FIG. 6 is a diagram illustrating a third example of the display information displayed by display device 220 according to the embodiment. The third example is an example of a case where utterance device 210 is a device such as a television equipped with a display capable of displaying display information. That is, in the present example, utterance device 210 is the first device and the second device. The third example is an example of a case where the type of utterance device 210 is used as the predetermined condition described above.

As illustrated in FIG. 5, utterance device 210 displays, for example, information indicating the type of utterance device 210 ("Notification uttered by television") and an utterance history indicating the content of a voice output by utterance device 210 on the basis of display information received from display controller 160. Thus, for example, display controller 160 causes display device 220 to display only one or more utterance histories extracted by extractor 150 from the plurality of utterance histories stored in utterance history storage 172.

In such a case, as illustrated in FIG. 6, display device 220 may display all of the plurality of utterance histories stored in utterance history storage 172.

In the present example, management apparatus 100 may not include estimator 140 or interest DB storage 173.

Processing Procedure

Subsequently, a processing procedure performed by management apparatus 100 will be described.

Figure 7:
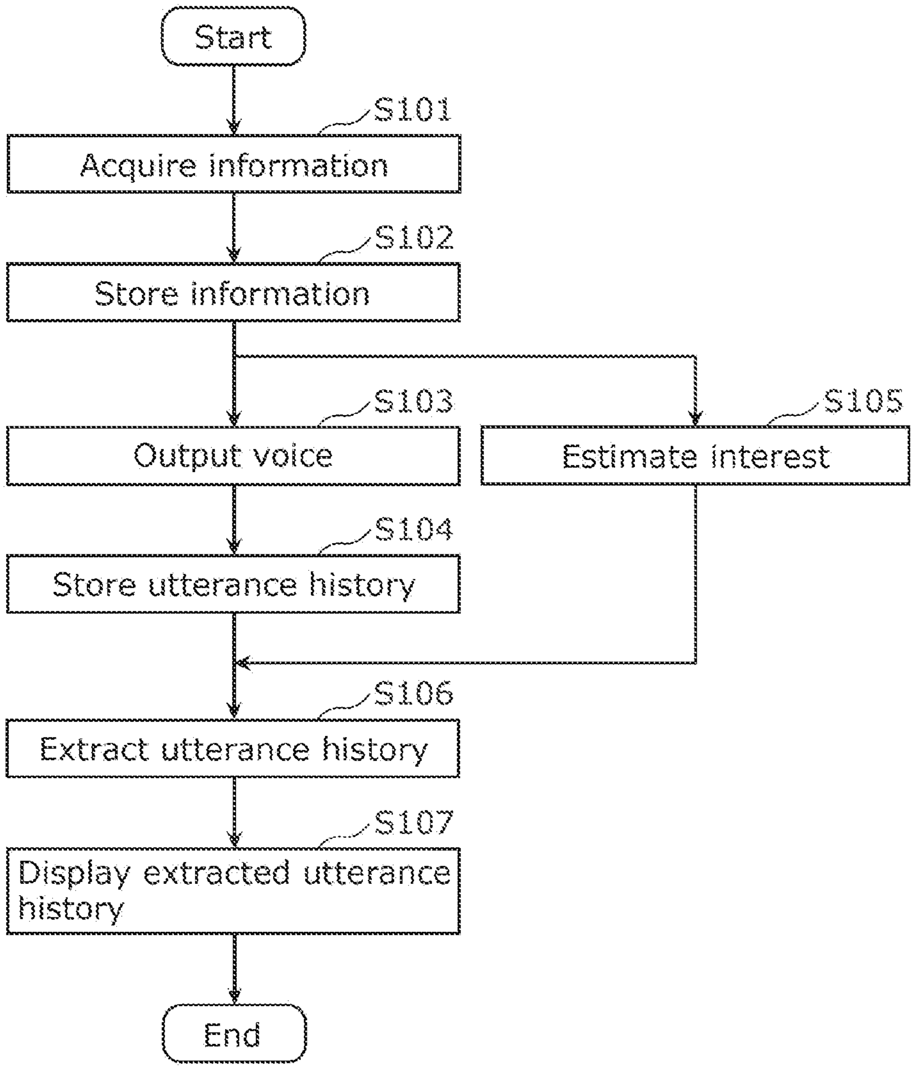
FIG. 7 is a flowchart illustrating a processing procedure of the management apparatus according to the embodiment.

FIG. 7 is a flowchart illustrating the processing procedure of management apparatus 100 according to the embodiment.

First, acquisition unit 120 acquires information (S101). For example, acquisition unit 120 acquires device information including state information from information source device 200 via communicator 110.

Next, acquisition unit 120 causes storage 170 to store the acquired information (S102). For example, acquisition unit 120 causes state information storage 171 to store the acquired state information.

Next, on the basis of the information acquired by acquisition unit 120, voice controller 130 causes utterance device 210 to output a voice relating to the information (S103). For example, voice controller 130 determines the content to be output by voice by utterance device 210 on the basis of the state information acquired by acquisition unit 120, and transmits the voice information indicating the determined content to utterance device 210. Utterance device 210 outputs a voice based on the received voice information.

Next, voice controller 130 causes utterance history storage 172 to store an utterance history indicating the content of the voice caused to be output by utterance device 210 (S104). For example, management apparatus 100 repeatedly performs steps S101 to S104 to store a plurality of utterance histories in utterance history storage 172.

In parallel with the processing of steps S103 and S104, estimator 140 estimates the user's interest on the basis of the state information stored in state information storage 171 (step S105). For example, estimator 140 determines the user's interest on the basis of the state information stored in state information storage 171 and an interest DB stored in interest DB storage 173.

Note that Step S105 may be performed in parallel with steps S103 and S104, before steps S103 and S104, or after steps S103 and S104.

Next to steps S104 and S105, extractor 150 extracts one or more utterance histories from the plurality of utterance histories stored in utterance history storage 172 on the basis of a predetermined condition (S106). For example, extractor 150 determines an utterance history corresponding to the user's interest estimated by estimator 140 on the basis of the interest DB and extracts the determined utterance history from the plurality of utterance histories stored in utterance history storage 172.

Next, display controller 160 causes display device 220 to display display information indicating the one or more utterance histories extracted by extractor 150 (S107). For example, display controller 160 transmits display information indicating the one or more utterance histories extracted by extractor 150 to display device 220. Display device 220 displays the received display information.

When extractor 150 extracts an utterance history on the basis of the type of utterance device 210 or the like rather than the user's interest, step S105 may not be performed.

Alternatively, extractor 150 may extract an utterance history on the basis of the type of information source device 200. For example, when display device 220 is a television, extractor 150 may extract the utterance history of the air conditioner.

Alternatively, extractor 150 may extract an utterance history on the basis of whether or not utterance device 210 has been able to be caused to properly output a voice on the basis of voice information. For example, when receiving voice information, utterance device 210 outputs a voice based on the voice information. Here, when utterance device 210 is unable to output a voice based on the voice information due to an error or the like, utterance device 210 transmits, to management apparatus 100, information indicating that the voice based on the voice information has been unable to be output. For example, when acquiring the information via communicator 110 and acquisition unit 120, voice controller 130 causes utterance history storage 172 to store the information and an utterance history indicating the content of the voice caused to be uttered (more specifically, tried to be caused to be uttered) by utterance device 210 in association with each other. Extractor 150 extracts the utterance history on the basis of the information, for example. Note that utterance device 210 may transmit, to management apparatus 100, information indicating whether or not a voice based on the voice information has been able to be output due to an error or the like.

Alternatively, extractor 150 may extract an utterance history that includes information requiring the user to take action. The contents of voices output by utterance device 210 may include information requiring the user to take action, such as a notification for resolving an error that has occurred in information source device 200. Extractor 150 may extract an utterance history including such information.

Alternatively, when there are a plurality of utterance histories having the same contents, extractor 150 may extract only the latest utterance history among the plurality of utterance histories having the same contents. For example, when an error occurs in information source device 200, and the error is not resolved, information source device 200 may repeatedly transmit information indicating the error to management apparatus 100 as state information. In such a case, voice controller 130 causes utterance device 210 to repeatedly output a voice with a content indicating the error and causes utterance history storage 172 to repeatedly store an utterance history indicating the content of the voice. Thus, utterance history storage 172 stores a plurality of utterance histories different only in the date and time when the voice was caused to be output. In such a case, extractor 150 may extract only the latest utterance history among the plurality of utterance histories having the same contents.

When utterance histories, the number of which is fewer than a predetermined number arbitrarily determined in advance, are stored in utterance history storage 172, extractor 150 may extract all the utterance histories stored in utterance history storage 172 regardless of the predetermined condition. That is, when the predetermined number or more of utterance histories are stored in utterance history storage 172, extractor 150 may extract one or more utterance histories from the plurality of utterance histories stored in utterance history storage 172 on the basis of the predetermined condition, and when fewer than the predetermined number of utterance histories are stored in utterance history storage 172, extractor 150 may extract all the utterance histories stored in utterance history storage 172. In this case, for example, the predetermined number only needs to be two or more and is not particularly limited. Information indicating the predetermined number is stored in advance in storage 170, for example.

Effects, etc.

As described above, management apparatus 100 according to the embodiment includes: extractor 150 that extracts, on the basis of a predetermined condition, one or more utterance histories from a plurality of utterance histories each indicating the content of a voice caused to be output by the first device (utterance device 210 in the present embodiment); and display controller 160 that causes the second device (display device 220 in the present embodiment) to display display information indicating the one or more utterance histories.

According to this, a predetermined condition is set appropriately, whereby the second device can be caused to display an utterance history desired by the user in a preferential and/or easy-to-see manner. Therefore, management apparatus 100 can make an utterance history easily viewable by the user.

For example, the predetermined condition is the type of the first device.

According to this, for example, when the first device and the second device are the same device, the utterance history of the device having output a voice is displayed on that device. Hence the user can easily understand which device has made an utterance with a content indicated by the utterance history included in the displayed display information.

For example, management apparatus 100 further includes estimator 140 for estimating the interest of the user who uses the third device (information source device 200 in the present embodiment) on the basis of state information indicating the state of the third device. In this case, the predetermined condition is the user's interest estimated by estimator 140.

According to this, with an utterance history being extracted on the basis of the user's interest, an utterance history that the user seems to particularly want to check can be displayed in a preferential and/or easy-to-see manner. Therefore, management apparatus 100 can make an utterance history more easily viewable by the user.

For example, display controller 160 causes the second device to display display information indicating, in a distinguishable manner, one or more utterance histories extracted by extractor 150 and an utterance history not extracted by extractor 150 among the plurality of utterance histories.

According to this, the predetermined condition is set appropriately, whereby the utterance history desired by the user and other utterance histories are displayed on the second device in a distinguishable manner by being grouped into different ranges, for example. Therefore, management apparatus 100 can make an utterance history more easily viewable by the user.

Management system 300 according to the embodiment includes management apparatus 100, the first device (e.g., utterance device 210), and the second device (e.g., display device 220).

The management method according to the present embodiment includes: extracting, on the basis of a predetermined condition, one or more utterance histories from a plurality of utterance histories each indicating the content of a voice caused to be output by the first device; (S106) and causing a second device to display information indicating the one or more utterance histories (S107).

The recording medium according to the embodiment is a non-transitory computer-readable recording medium having recorded thereon a program for causing a computer to execute the management method according to the embodiment.

According to these, the same effects as those of management apparatus 100 described above are obtained.

Other Embodiments

Although the management apparatus and the like according to the present disclosure have been described above on the basis of the embodiment, the present disclosure is not limited to the above embodiment.

For example, the first device, the second device, and the third device may be achieved by the same device (i.e., integrated device) or may be achieved by different devices (i.e., separate devices).

Management system 300 may be achieved by a plurality of devices or may be achieved by a single device.

The information acquired by acquisition unit 120 may be information (service information) about a service received by the user, such as information on home delivery. In this case, for example, information source device 200 may be an interphone, a server device of a company making a home delivery service, or the like. For example, voice controller 130 causes utterance device 210 to output information on service information indicating a delivery attempt notice at the time of delivery by voice and causes utterance history storage 172 to store an utterance history indicating that utterance device 210 has output the information by voice.

For example, in the above embodiment, all or some of the components of the processors, such as acquisition unit 120 and voice controller 130, included in each of the management apparatus and the management system may be formed of dedicated hardware or may be achieved by executing software programs suitable for the components. Each of the components may be achieved by a program execution unit, such as a CPU or a processor, reading and executing a software program recorded on a recording medium such as an HDD or a semiconductor memory.

For example, the components of the processor may include one or more electronic circuits. Each of the one or more electronic circuits may be a general circuit or a dedicated circuit.

The one or more electronic circuits may include, for example, a semiconductor device, an integrated circuit (IC), or a large-scale integrated circuit (LSI). The IC or the LSI may be integrated on one chip or on a plurality of chips. Here, the electronic circuit is referred to as the "IC" or the "LSI", but the name changes depending on the degree of integration, and the circuit may be referred to as a system LSI, a very-large-scale integrated circuit (VLSI), or an ultra-large-scale integrated circuit (ULSI). A field-programmable gate array (FPGA) programmed after the manufacture of the LSI can also be used for the same purpose.

The general or specific aspects of the present disclosure may be achieved by a system, apparatus, method, integrated circuit, or computer program. Alternatively, the general or specific aspects of the present disclosure may be achieved by a computer-readable non-temporary recording medium such as an optical disk, HDD, or semiconductor memory in which the computer program is stored.

Further, the general or specific aspects of the present disclosure may be achieved by any combination of the system, apparatus, method, integrated circuit, computer program, and recording medium.

In addition, ones obtained by applying various modifications conceivable by a person skilled in the art to the present embodiment and forms constructed by combining components of different embodiments are also within the scope of the present disclosure so long as not departing from the spirit of the present disclosure.

Industrial Availability

The present disclosure can be applied to a device capable of outputting a voice, such as a television or an autonomous vacuum cleaner. Alternatively, the present disclosure can be applied to a device for controlling a device capable of outputting a voice, such as a server device.

The invention claimed is:

1. A management apparatus comprising:

an extractor that extracts one or more utterance histories from a plurality of utterance histories each indicating a content of a voice caused to be output by a first device;

a display controller that causes a second device to display display information indicating the one or more utterance histories; and an estimator that estimates an interest of a user who uses a third device, on a basis of status of use of the third device by the user, wherein the extractor extracts the one or more utterance histories corresponding to the interest of the user, the content of the voice caused to be output by the first device is information related to a plurality of third devices that are mutually different in type, and on a basis of an interest estimated from status of use of one third device among the plurality of third devices, the extractor extracts an utterance history related to each of, among the plurality of third devices, one or more third devices of one or more types other than a type of the one third device.

2. The management apparatus according to claim 1, wherein the display controller causes the second device to display, as the display information, both the one or more utterance histories and an utterance history not extracted by the extractor from the plurality of utterance histories, the one or more utterance histories are displayed in a first area, and the utterance history not extracted by the extractor from the plurality of utterance histories is displayed in a second area that is different from the first area, and the one or more utterance histories displayed in the first area, and the utterance history not extracted by the extractor displayed in the second area are distinguishable from one another.

3. A management system comprising:

the management apparatus according to claim 1;

the first device; and the second device.

4. The management apparatus according to claim 1, wherein each of the plurality of third devices is a sort of a home appliance.

5. A management method comprising:

extracting, one or more utterance histories from a plurality of utterance histories each indicating a content of a voice caused to be output by a first device;

causing a second device to display display information indicating the one or more utterance histories; and estimating an interest of a user who uses a third device, on a basis of status of use of the third device by the user, wherein in the extracting, the one or more utterance histories corresponding to the interest of the user are extracted, the content of the voice output by the first device is information related to a plurality of third devices that are mutually different in type, and in the extracting, on a basis of an interest estimated from status of use of one third device among the plurality of third devices, an utterance history related to each of, among the plurality of third devices, one or more third devices of one or more types other than a type of the one third device is extracted.

6. A non-transitory computer-readable recording medium having recorded thereon a program for causing a computer to execute the management method according to claim 5.

7. The management method according to claim 5, wherein each of the plurality of third devices is a sort of a home appliance.

* * * * *